July 15, 1930.                J. WEINBERGER                1,770,501
                           ELECTROMAGNETIC REPRODUCER
                              Filed Aug. 29, 1925

INVENTOR
JULIUS WEINBERGER
BY *Ira J. Adams*
ATTORNEY

Patented July 15, 1930

1,770,501

UNITED STATES PATENT OFFICE

JULIUS WEINBERGER, OF NEW YORK, N. Y., ASSIGNOR TO RADIO CORPORATION OF AMERICA, A CORPORATION OF DELAWARE

ELECTROMAGNETIC REPRODUCER

Application filed August 29, 1925. Serial No. 53,422.

The invention relates to electro-magnetic recorders or reproducers for phonographs or similar devices and has for its principal object to provide such a device which shall be free from distortion due to resonant points in the vibrating mechanism.

A more specific object of the invention is to provide an electromagnetic recorder or reproducer which causes variation of currents in an electric circuit due to vibrations of its vibratory system and which shall be free from resonant points in the vibrating system.

Still another object of the invention is to provide a vibratory system in which the mass, resiliency and damping shall be in separate elements whereby each may be separately chosen without modifying either of the others.

Still another object of the invention is to provide a vibratory system for electro-magnetic recorders or reproducers wherein undulating currents are caused by flux variation effected by the vibratory system and which has an appropriate damping system for preventing mechanical resonance effects in the vibratory system.

Still another object of the invention is to provide an electro-magnetic recorder or reproducer in which variations of electric currents are occasioned by changing impedance effected by the vibratory system and in which the vibratory system has its mass, resiliency and damping each isolated in a separate element whereby each may be adjusted independently of the others.

The usual type of reproducer in phonographs consists of a needle which moves in a groove formed in the record whose bottom or sides have serrations thereon to cause vibration of the needle. The needle is fastened to an arm which impinges on or is connected in some manner to a diaphragm. The vibrations of the needle are thereby transferred to the diaphragm causing it to emit sounds which are reproductions of those originally causing the serrations in the record grooves. The electric phonograph is similar in its operation but instead of the needle vibrations being transferred mechanically to the diaphragm they effect current changes in an electric circuit including an electromagnet whose armature may be either the diaphragm itself or a magnetic member mechanically connected to the diaphragm. The present invention applies more specifically to the latter type of phonograph and embodies improvements in the electrical and mechanical system which will become apparent as the description proceeds.

Unless there is some damping system connected with the vibratory mechanism the mechanism will have one or more natural periods of vibration within the audible range at which the amplitude of vibration will be much increased over that at other frequencies thus causing considerable distortion of the original sound, giving it a grating or metallic quality which is very annoying and ruins the artistic effect of the reproduction entirely. In most of the desirable vibratory mechanisms now in use there are several such resonant periods well within the range of audibility. Now, I have discovered that by making a damping device which is a separate entity entirely distinct from the diaphragm and by certain improvements in the electrical details of the system I can reproduce original sounds with an unusual degree of faithfulness and intensity and increase generally the efficiency of operation and artistic effect of the reproduction.

The invention can best be understood by referring to the following detailed description which should be read in connection with the accompanying drawing, in which like reference characters represent the same parts in the several views and in which Fig. 1 shows the device completely assembled.

Figure 4:
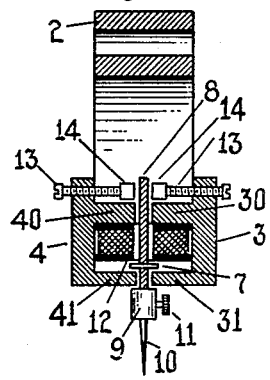
Fig. 4 is a vertical central section.
Figure 6:
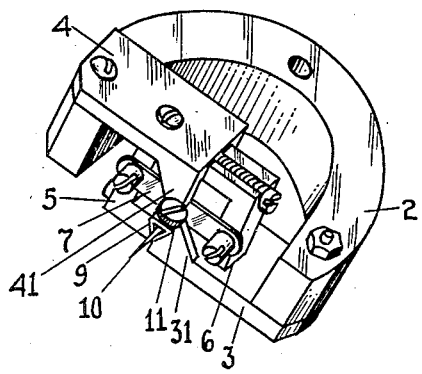
Fig. 6 is a perspective view, the cover plates being removed to disclose the operating mechanism.
Figure 3:
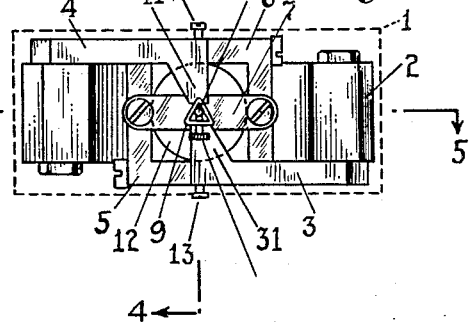
Fig. 3 is a bottom plan view of the device.

The reproducer, as illustrated, comprises a permanent U-shaped magnet 2 to whose ends are attached the pole pieces 3 and 4. These pole pieces consist essentially of a flat rather thick plate attached by screws to the U-shaped magnet at one end each having a pair of lateral extensions at its free end whose shape can be readily seen in Figs. 3, 4 and 6. The extensions on the pole piece 3 are represented by the reference characters 30 and 31 and those on the pole piece 4 at 40 and 41. The extension 30 has its flat end face opposed to the flat end face of the extension 40 and the extensions 31 and 41 are similarly placed, a small air gap being left between the opposing faces. It will be noted that the coacting pole pieces with their associated extensions outline a central cavity open at the ends in which is placed the operating coil 12. The open ends of this cavity are partially closed by angle-shaped members 5 and 6 which are attached to the pole pieces 3 and 4 by suitable screws. These angle members serve as supports for certain operating elements of the device and should preferably be of non-magnetic material.

The vibratory system of the device consists of a flat spring 7 to which is attached by electric welding or otherwise a flat steel bar 8. The bar extends through the spring and has one of its ends enlarged as at 9, this enlarged end having a cavity in which the phonograph needle 10 may be clamped by the thumb screw 11. The metal spring 7 is attached to the supporting members 5 and 6 in position to make the steel bar extend centrally through the air gaps between the extending extensions on the pole pieces and through the central opening of the coil 12. In the specific embodiment shown the spring 7 extends between the coil 12 and the lower extensions 31 and 41. It should be noted that in the arrangement thus far described substantially all the mass of the vibratory system resides in the steel bar 8 and all the resiliency in the spring 7 whereby both the mass and resiliency can be chosen independently of each other.

The arrangement thus far described without further modification would be objectionable as the vibratory system for the most desirable conditions would have several mechanical resonant points within the range of audibility causing considerable distortion in the sound emitted. This difficulty may be overcome by adopting a suitable damping system and the one hereinafter described has been found to be admirable for the purpose.

The damping system comprises two screws 13 threaded into suitable tapped holes in the pole pieces and having at their inner ends soft knobs 14 of rubber or other suitable material adapted to engage the steel bar 8. The damping may be varied by merely tightening or loosening the screws 13 thereby causing the rubber knobs 14 to bear against the bar 8 more or less firmly. A method is thus provided for varying the damping at will and for separating it entirely from the elements comprising the mass and resiliency of the vibrating system.

The damping system may also be arranged to act on the resilient element of the vibratory system, in this case the left spring.

The spring 7 should be so located and the two damping devices so adjusted that the bar 8 assumes a normal rest position midway between the magnetic extensions 30, 40 and 31, 41 and with its longitudinal axis extending through the center line of the coil 12.

The extensions 40 and 41 are of like polarity opposite to that of the lugs 30 and 31. In its normal rest position the steel bar 8 is symmetrically located with respect to the pole pieces and will therefore have no effect on the magnetic flux distribution. The flux under these conditions will pass between the extensions 30 and 40 and between the extensions 31 and 41, substantially none of it interlinking with the coil 12. When the needle 10 vibrates, owing to serrations on the record grooves, the bar 8 will be displaced from its symmetrical location and its displacement will follow the vibrations of the needle. These displacements of the bar 8 will cause it to flex the spring 7 and the bar will tend to turn about the spring as a pivot. As it leaves its central rest position therefore its upper end will approach an upper extension 30 or 40 and its lower end will approach the oppositely disposed lower extension 41 or 31. This will cause a leakage flux to flow through the bar 8 from the upper extension 40, for example, to the lower extension 31 thus causing part of the flux to link with the coil 12. This leakage flux will cause changes in the impedance of the coil 12 and these changes in impedance will be proportional to and follow accurately the vibrations of the needle 10.

The changes in impedances of the coil 12 may be made use of to modulate a vacuum tube oscillator and the modulated oscillations may be detected and caused to operate a loud speaker.

Figure 1:
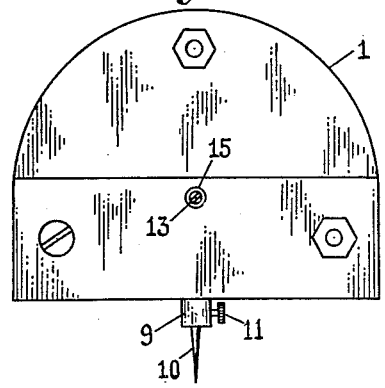
Figure 5:
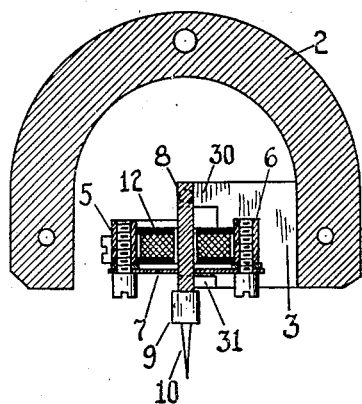
Fig. 5 is a vertical central section at right angles to the section shown in Fig. 4
Figure 2:
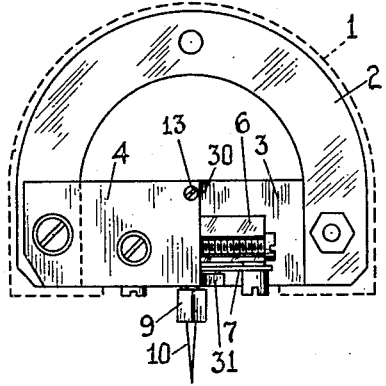
Fig. 2 is a side elevation of the device with the cover plates removed.

The whole device after assembly may be enclosed with a cover shown at 1 in Fig. 1. The cover must leave the needle 10 exposed so that it will be free to vibrate and the cover should preferably have holes shown at 15 therein through which the heads of the adjusting screws 13 may be reached to permit of adjusting the damping without removing the cover.

It it obvious that the device can also be used as a reproducer, the only essential change being in the needle or stylus. In this case the undulating currents in the actuating coil will cause vibrations of the needle causing it to cut sound impressions in the record grooves.

While I have disclosed my invention in connection with a very specific embodiment it is obvious that many different ways of applying it will readily occur to those skilled in the art and I intend the invention to be limited only as indicated by the scope of the following claims.

I claim:

1. In a phonograph reproducer, a laterally twistable spring blade supported at its ends, and a needle arm secured to and supported by said blade which also forms a solid pivot bearing for said arm.

2. A phonograph reproducer comprising a permanent magnet, a pole piece for each pole of said permanent magnet, a pair of extensions on each pole piece, said pole pieces being positioned to form air gaps between the extensions on one pole piece and the extensions on the other pole piece, an armature positioned in said air gaps, a winding positioned between said extensions and arranged to surround said armature, a pivot for said armature located between said winding and the air gap formed by one of the extensions on each of said pole pieces, and means for vibrating said armature.

3. A phonograph reproducer comprising means for providing a magnetic field, pole pieces for said means, extensions on said pole pieces, an armature positioned adjacent said extensions, a winding surrounding said armature and positioned between said extensions, and a spring member secured to said armature to form a pivot therefor, said spring member being positioned between said winding and one of the extensions on each of said pole pieces.

4. A phonograph reproducer comprising an armature, means for vibrating said armature, said means being attached to one end of said armature, means for providing a magnetic field, a pole piece for the last mentioned means, a pair of extensions on said pole piece, said extensions terminating near the ends of said armature and out of contact therewith, a winding surrounding said armature and positioned between said extensions, a spring blade pivot member secured to said armature and positioned adjacent one of said extensions, and means for damping vibrations of said armature and for limiting its movement positioned to contact with the other end of said armature.

5. A phonograph reproducer comprising means for providing a magnetic field, a pair of pole pieces for said means, a plurality of extensions on each pole piece, said pole pieces being arranged so that the extensions on one pole piece form pairs with the extensions on the other pole piece, an armature positioned between said pairs of extensions and out of contact therewith, and a pivot for said armature positioned adjacent one of said pairs of extensions.

6. A phonograph reproducer comprising a member for providing a magnetic field, a pair of pole pieces for said member, two extensions on each pole piece, said pole pieces being arranged so that the extensions on one pole piece form pairs with the extensions on the other pole piece, an armature positioned between said pairs of extensions and out of contact therewith, and a flat spring pivot member secured to said armature and positioned immediately adjacent one of said pairs of extensions.

7. A magnet system for a phonograph reproducer comprising a permanent magnet, pole pieces for said magnet, an armature positioned between said pole pieces, means for vibrating said armature, said means being attached to one end of said armature, and pivot means for said armature, said pivot means being positioned to contact with said armature at a point substantially one-third of its length from the end to which the means for vibrating the armature is attached.

8. A magnet system for a phonograph reproducer comprising a permanent magnet, pole pieces for said magnet, an armature positioned between said pole pieces, means for vibrating said armature, said means being attached to one end of said armature, angle members attached to said pole pieces, a flat spring blade secured at its ends to said angle members, said spring blade being secured at an intermediate point to said armature and forming a solid pivot for said armature, and damping means for reducing the vibrations of said armature, said damping means comprising a screw member threaded in each of said pole pieces and provided at its end with yielding material for contacting with the other end of said armature.

JULIUS WEINBERGER.